United States Patent
Christoph et al.

(10) Patent No.: US 9,558,171 B2
(45) Date of Patent: Jan. 31, 2017

(54) FORMATTING TABLES FOR DISPLAY ON COMPUTING DEVICES OF VARYING SCREEN SIZE

(71) Applicants: Georg Christoph, Karlsruhe (DE); Annette Jann, Walldorf (DE); Gerard Keane, Wiesloch (DE); Johannes Osterhoff, Heidelberg (DE)

(72) Inventors: Georg Christoph, Karlsruhe (DE); Annette Jann, Walldorf (DE); Gerard Keane, Wiesloch (DE); Johannes Osterhoff, Heidelberg (DE)

(73) Assignee: SAP SE, Walldorf (DE)

(*) Notice: Subject to any disclaimer, the term of this patent is extended or adjusted under 35 U.S.C. 154(b) by 100 days.

(21) Appl. No.: 14/489,175

(22) Filed: Sep. 17, 2014

(65) Prior Publication Data
US 2016/0077694 A1 Mar. 17, 2016

(51) Int. Cl.
G06F 17/00 (2006.01)
G06F 17/24 (2006.01)
G06F 17/21 (2006.01)
G06F 17/30 (2006.01)

(52) U.S. Cl.
CPC ........... *G06F 17/245* (2013.01); *G06F 17/211* (2013.01); *G06F 17/30905* (2013.01)

(58) Field of Classification Search
CPC .................................................. G06F 17/245
See application file for complete search history.

(56) References Cited

U.S. PATENT DOCUMENTS

| 6,300,947 | B1* | 10/2001 | Kanevsky | G06F 17/30905 707/E17.121 |
|---|---|---|---|---|
| 8,745,515 | B2* | 6/2014 | Makela | G06F 3/0481 715/767 |
| 2006/0117253 | A1* | 6/2006 | Polash | G06F 17/211 715/247 |
| 2008/0148166 | A1* | 6/2008 | Brunswig | G06F 9/4443 715/766 |
| 2011/0289397 | A1* | 11/2011 | Eastmond | G06F 3/0485 715/212 |

OTHER PUBLICATIONS

Bilauca et al., "Building Table Formatting Tools," DocEng'11, Sep. 19-22, 2011, Mountain View, California, USA, Copyright 2011 ACM, p. 13-22.*

* cited by examiner

*Primary Examiner* — Amelia Tapp
(74) *Attorney, Agent, or Firm* — Mintz Levin Cohn Ferris Glovsky and Popeo, P.C.

(57) ABSTRACT

The subject matter disclosed herein provides methods for formatting a table for display on a computing device. A table having one or more rows and one or more columns may be accessed. The rows may correspond to one or more data records. The data records may have one or more data values distributed across the columns. The columns may be associated with one or more column labels and one or more priority values. A size of a display screen on a computing device may be determined. A table may be formatted by moving a column label and a data value in at least one column into an area between successive data records. The formatting may be based on the display screen size and an associated column priority value. The formatted table may be caused to be displayed on the computing device. Related apparatus, systems, techniques, and articles are also described.

14 Claims, 6 Drawing Sheets

| | | | |
|---|---|---|---|
| Identifier | | | Price 262 |
| Product AA | 📎 | 📅 🏢 | 12.00 EUR 264 |
| Quantity: 10 EA | | | |
| Vendor: Vendor A | | | |
| Value Limit: 15.00 EUR | | | |
| Product A | 📎 | 📅 🏢 | 3.00 EUR 266 |
| Quantity: 1 EA | | | |
| Vendor: Vendor B | | | |
| Value Limit: 5.00 EUR | | | |
| Product Z | 📎 | 📅 🏢 | 45.00 EUR 268 |
| Quantity: 8 EA | | | |
| ... | | | |

| Identifier Description | Value |
|---|---|
| Product D | 10.00 EUR |
| Status: Available | |
| Product X | 25.00 EUR |
| Status: | |
| Unavailable - On | |
| backorder through | |
| December 1, 2014 | |

FORMATTING TABLES FOR DISPLAY ON COMPUTING DEVICES OF VARYING SCREEN SIZE

TECHNICAL FIELD

This disclosure relates generally to formatting tables and, in particular, to formatting data tables for display on computing devices having varying screen sizes.

BACKGROUND

Businesses manipulate large amounts of data records every day. These data records may be stored in tables that may be accessed, viewed, and/or modified by individuals using different types of computing devices. Depending on the amount of data and type of content in these tables, the tables may span multiple columns. While an individual may have no problem viewing a large table on a computing device having a large display screen (e.g., a desktop computer), he/she may have difficulty navigating the table on a computing device having a small display screen (e.g., a tablet computer or a mobile phone). Conventional solutions resolve these issues by hiding data columns or requiring a user to scroll horizontally and vertically to view a table on such small screen devices. These solutions, however, result in a loss of data and impede the ability to quickly compare data records in the table.

SUMMARY

In some implementations, methods and apparatus, including computer program products, are provided for formatting a table for display on a computing device.

In one aspect, a table having one or more rows and one or more columns is accessed. The one or more rows correspond to one or more data records. The one or more data records have one or more data values distributed across the one or more columns. The one or more columns are associated with one or more column labels and one or more priority values. A size of a display screen on a computing device is determined. The table is formatted by moving a column label and a data value in at least one of the columns into an area between successive data records. The formatting is based on the size of the display screen and an associated priority value of the column. The formatted table is caused to be displayed on the computing device.

The above methods, apparatus, and computer program products may, in some implementations, further include one or more of the following features.

The at least one column may include a first column having a first column label, a first data value, and a first priority value. The at least one column may further include a second column having a second column label, a second data value, and a second priority value. The formatting may move the first column label and the first data value above the second column label and the second data value when the first priority value is greater than the second priority value.

The formatting may move the column label of the at least one column to a first row and the data value of the at least one column to a second row. The first row may be equivalent to the second row when a number of characters in the data value is less than or equal to a threshold value. The first row may lie above the second row when a number of characters in the data value is greater than a threshold value or when the data value comprises a control object.

The control object may be at least one of a progress indicator, a slider button, a form, an input field, and a drop-down box, a responsive table, a link, a chart, a micro-chart, a date picker, a radio button, and a switch.

The formatted table may be viewable in entirety only by unidirectional scrolling.

The formatting may not move a column label and a data value in a different one of the columns.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

Like reference symbols in the various drawings indicate like elements.

DETAILED DESCRIPTION

This application discloses techniques for formatting a table for display on computing devices of varying display screen sizes. In order to view a table on a computing device having a small display screen, such as a tablet computer or mobile phone, a user may need to scroll the display in two different directions (i.e., horizontally and vertically) or open multiple windows in order to view the entire table. Spreading a table across different directions and/or different windows may impede a user's ability to efficiently compare different data records in the table. The techniques described below resolve this shortcoming by formatting a table based on the computing device's screen size and one or more priority values associated with the columns in the table.

Figure 1:
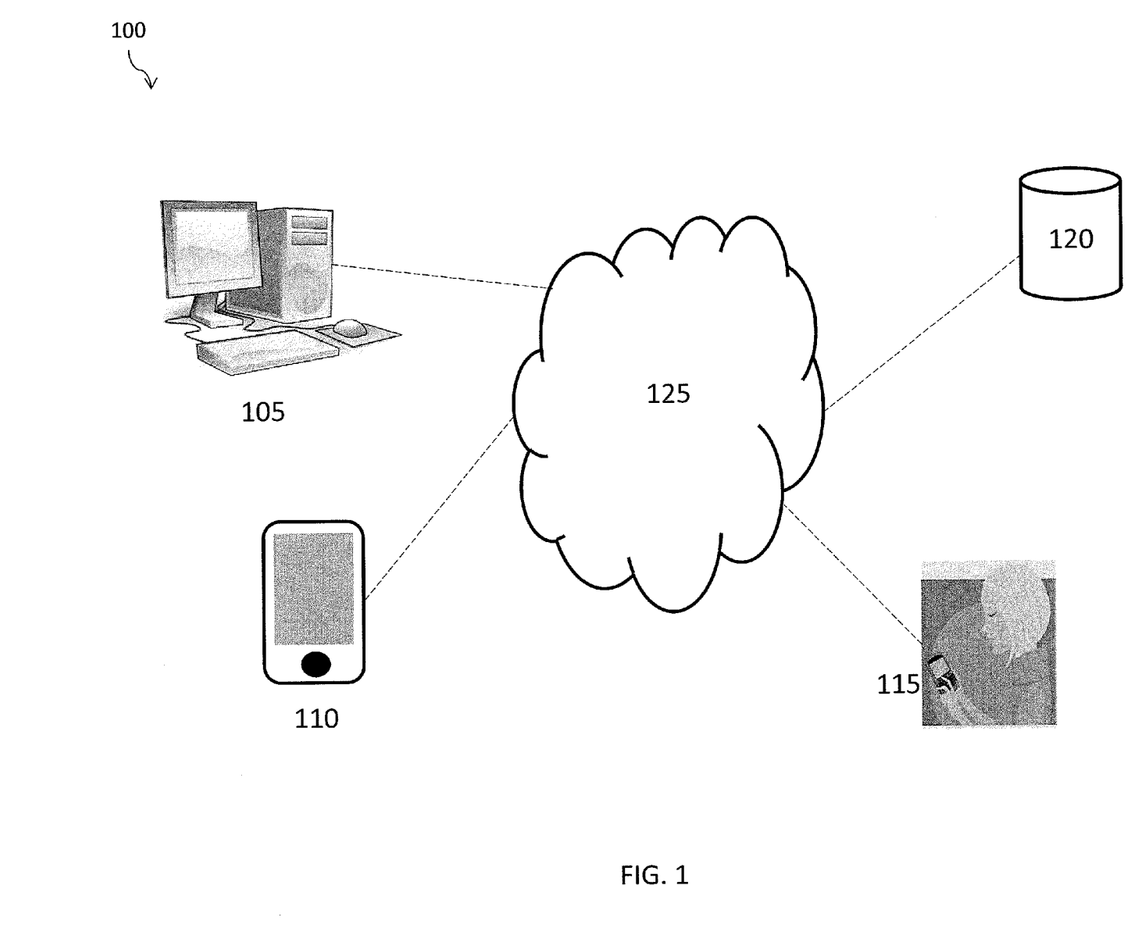
FIG. 1 illustrates a system for using various table formatting techniques, in accordance with some example implementations.

FIG. 1 illustrates an exemplary system 100 for using the table formatting techniques described herein. System 100 may include computing devices 105, 110, and 115. These computing devices may be operatively connected to database server 120 via network 125. In the implementation of FIG. 1, computing device 105 may be a desktop computer, computing device 110 may be a table computer, and computing device 115 may be a mobile phone (such as a smart phone), although other types of computing devices may be used. A user may use computing devices 105, 110, and/or 115 to open, view, and/or modify a table. This table may be stored locally at computing devices 105, 110, and/or 115 or stored remotely at database server 120. Computing devices 105, 110, and/or 115 may access the table using a table editing application running on database server 120. This table editing application may include one or more processes for formatting the table. In some implementations, the table editing application may reside locally on computing devices 105, 110, and 115.

Figure 2:
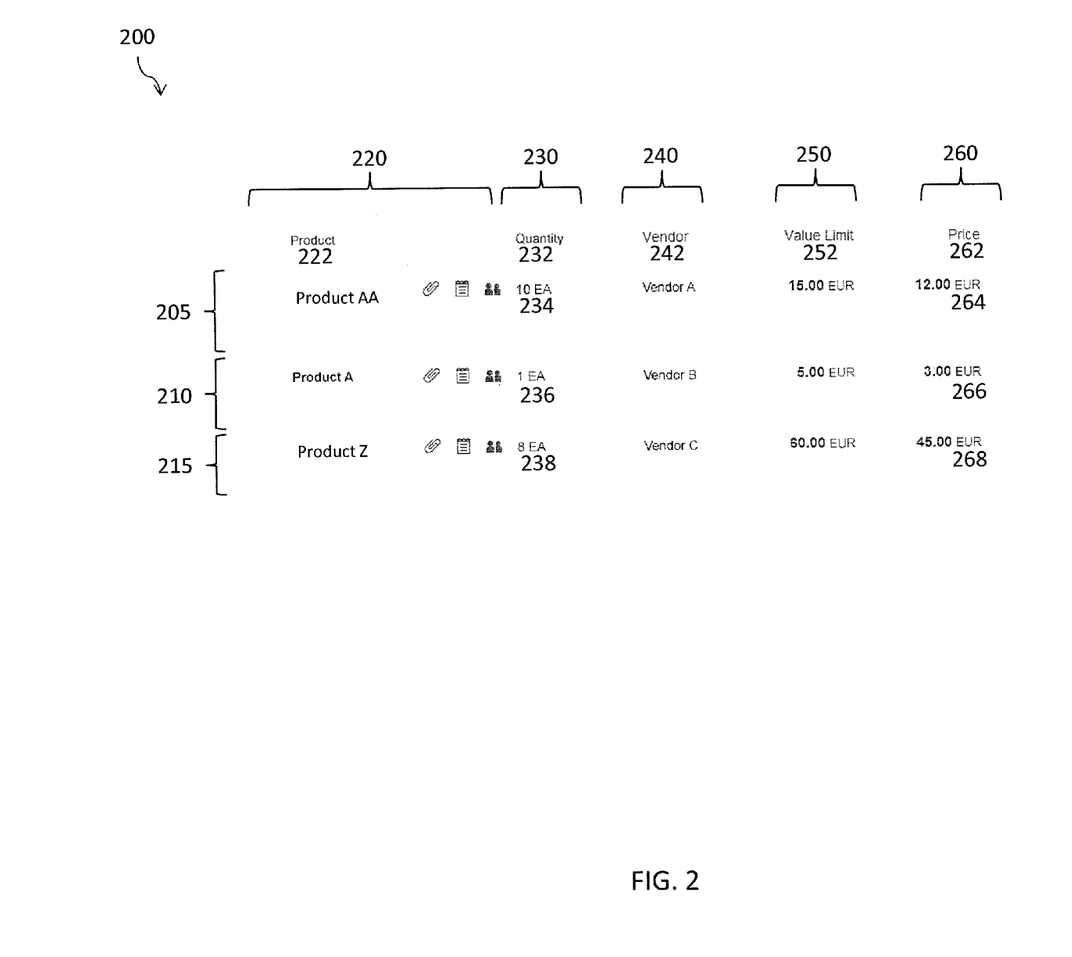
FIG. 2 illustrates a table that may be viewed on a computing device, in accordance with some example implementations.

FIG. 2 illustrates a table 200 that may be viewed on desktop computer 105. Table 200 may include data records 205, 210, and 215. Data records 205, 210, and 215 may have one or more data values distributed across columns 220, 230, 240, 250, and 260. Columns 220, 230, 240, 250, and 260 may have corresponding column labels 222, 232, 242, 252, and 262, respectively. For example, column 230 may be associated with column label 232 ("Quantity") and may have data values 234 ("10 EA"), 236 ("1 EA"), and 238 ("8 EA") for data records 205, 210, and 215, respectively. Data values 234, 236, and 238 may include text and numbers as illustrated in the implementation of FIG. 2. In some implementations, however, these data values may include images and interactive control objects. These control objects may include, for example, progress indicators, slider buttons, forms, input fields, drop-down boxes, responsive tables, links, charts, micro-charts, date pickers, radio buttons, switches, and the like.

Table 200 may be easy to view on desktop computer 105 given its large screen size. However, if a user views table 200 on tablet computer 110 or mobile phone 115, it may be difficult to view all of columns 220, 230, 240, 250, and 260 without requiring the user to scroll the display horizontally. Generally, a table having more than five columns may be difficult to view on a tablet computer without horizontal scrolling. Likewise, a table having more than three columns may be difficult to view on a mobile phone without horizontal scrolling.

Figure 3:
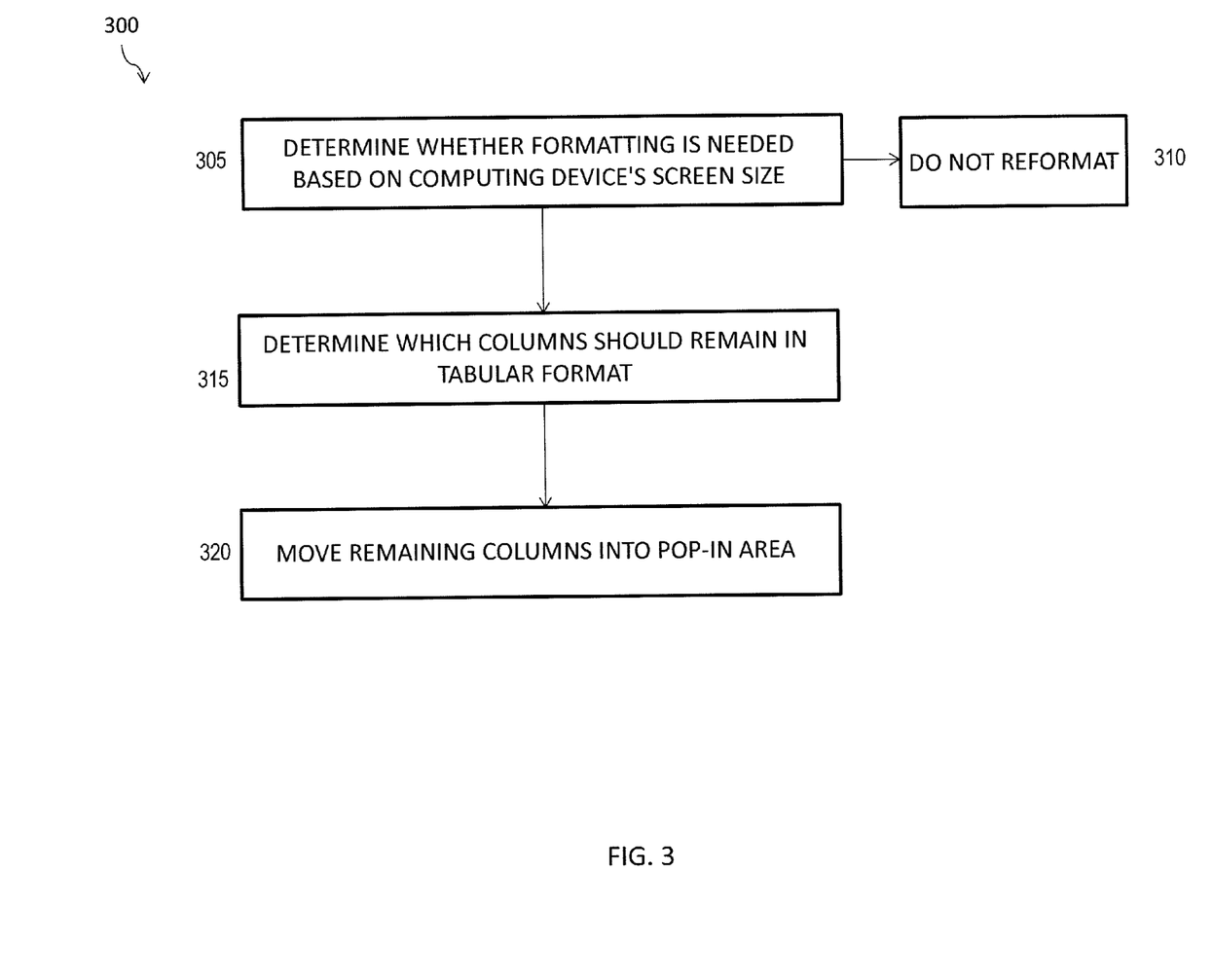
FIG. 3 illustrates a process for formatting a table, in accordance with some example implementations.

FIG. 3 illustrates a process 300 for formatting table 200 for display on computing devices having small screens. The table editing application may perform process 300 when computing devices 105, 110, and/or 115 access table 200.

At operation 305, the table editing application may determine whether table formatting is needed based on the computing device's screen size. When computing devices 105, 110, and/or 115 access table 200, they may send a request to database server 120. This request may include information representative of the computing device's type. For example, if computing device 105 requests accesses to table 200, the computing device may send a request to database server 120 that indicates that it is a desktop computer. Based on this device type, the table editing application may determine whether table 200 needs to be formatted. If the request indicates that the computing device is desktop computer (such as computing device 105), then the table editing application may infer that this computing device has a large display screen and that table formatting is unnecessary (i.e., operation 310). If, however, the request indicates that the computing device is a tablet computer (such as tablet computer 110) or a mobile phone (such as mobile phone 115), then the table editing application may infer that the computing device has a small display screen and, consequently, that table formatting is needed.

In some implementations, the access request may include the pixel width of the computing device's display screen. Generally, desktop computer screens have a pixel width of approximately 1,280 pixels; tablet computers have a pixel width of approximately 1,024 pixels; and mobile phones have a pixel width of approximately 320 pixels. The table editing application may compare the computing device's pixel width to a predetermined threshold value to determine whether table 200 needs to be formatted. If the computing device's pixel width is less than or equal to this threshold value, then formatting may be needed. If, however, the pixel width is greater than the threshold value, then formatting may be unnecessary. For example, if the threshold value is set at 1,024 pixels and desktop computer 105 sends a request to application server 120 to accesses table 200, the table editing application may not format table 200 because the desktop computer's pixel width is greater than the threshold value.

Figure 4:
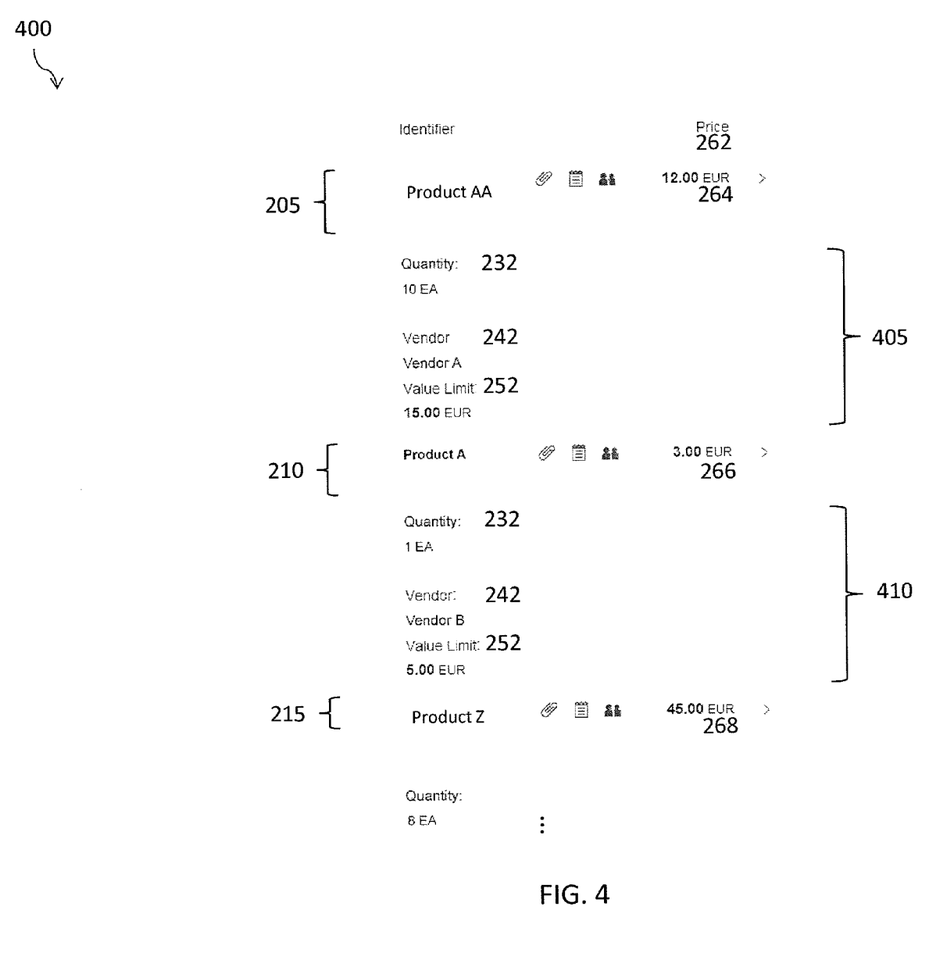
FIG. 4 illustrates a formatted table that may be viewed on a computing device, in accordance with some example implementations.

The table editing application may format table 200 at operations 315 and 320. FIG. 4 illustrates an exemplary formatted table 400 that includes data records 205, 210, and 215. The table editing application may create table 400 by keeping some column labels and data values from table 200 in tabular form (i.e., in columns) and moving the remaining column labels and data values as described below with respect to operations 315 and 320, respectively.

At operation 315, the table editing application may determine which columns from table 200 should remain in tabular form. When table 200 is initially created, the developer may want certain data values to always be displayed in columns irrespective of the computing device displaying the table. Doing so may be useful when the developer wants to highlight or emphasize certain data values. For example, if the developer is creating a merchandise inventory table, then item quantities may be important data values that should always be displayed in tabular form. In the implementation of FIG. 2, for example, a developer may always want price column label 262 and corresponding data values 264, 266, and 268 to be displayed in tabular form irrespective of the computing device displaying the table. The developer may indicate this preference by attaching a flag or other indicator (e.g., a variable, attribute, and the like) to column 260. During operation 315, the table editing application may determine which data values to keep in tabular form based on the presence or absence of these flags. In the implementation of FIG. 4, for example, the table editing application may display column label 262 and data values 264, 266, and 268 in tabular form.

At operation 320, the table editing application may move the data in the remaining columns from table 200 into the pop-in areas of formatted table 400. A pop-in area may be the space between successive data records. For example, pop-in area 405 may be between data records 205 and 210. The table editing application may populate pop-in area 405 with the column labels and data values associated with data record 205. Pop-in area 405 may include, for example, the quantity of products ("10 EA") associated with product AA, the vendor ("Vendor A") associated with this product, and the value limit ("15.00 EUR") of this product. Similarly, pop-in area 410 may be between data records 210 and 215 and may include column labels and data values associated with data record 210. Vertically displaying data in pop-in areas (as illustrated in FIG. 4) rather than columns (as illustrated in FIG. 2) reduces the width of table 400. This reduction in table width allows a user to easily navigate table 400 with unidirectional scrolling (i.e., vertical scrolling)

instead of the bidirectional scrolling (i.e., horizontal and vertical scrolling) required to navigate table 200.

The order in which column labels 232 ("Quantity"), 242 ("Vendor"), and 252 ("Value Limit") and their data values appear in pop-in areas 405 and 410 may be customized. When table 200 is created, the developer may assign column priorities to each column. These column priorities may, in turn, dictate the order in which the table editing application displays the columns labels and their corresponding data values during operation 320. For example, if the developer wants quantity, vendor, and value limit data values to be displayed in the order illustrated in table 400, then he/she may assign a high priority value to column 230, a medium priority value to column 240, and a low priority value to column 250 when creating table 200. During operation 320, the table editing application may use these priority values to specify the order of column labels and their corresponding data values in formatted table 400. Based on the priority assignments described above, quantity data values may be displayed before vendor data values which, in turn, may be displayed before value limit data values. Although this example uses low, medium, and high priority values, other types of priority values may be assigned including, for example, numerical priority values.

Figure 5:
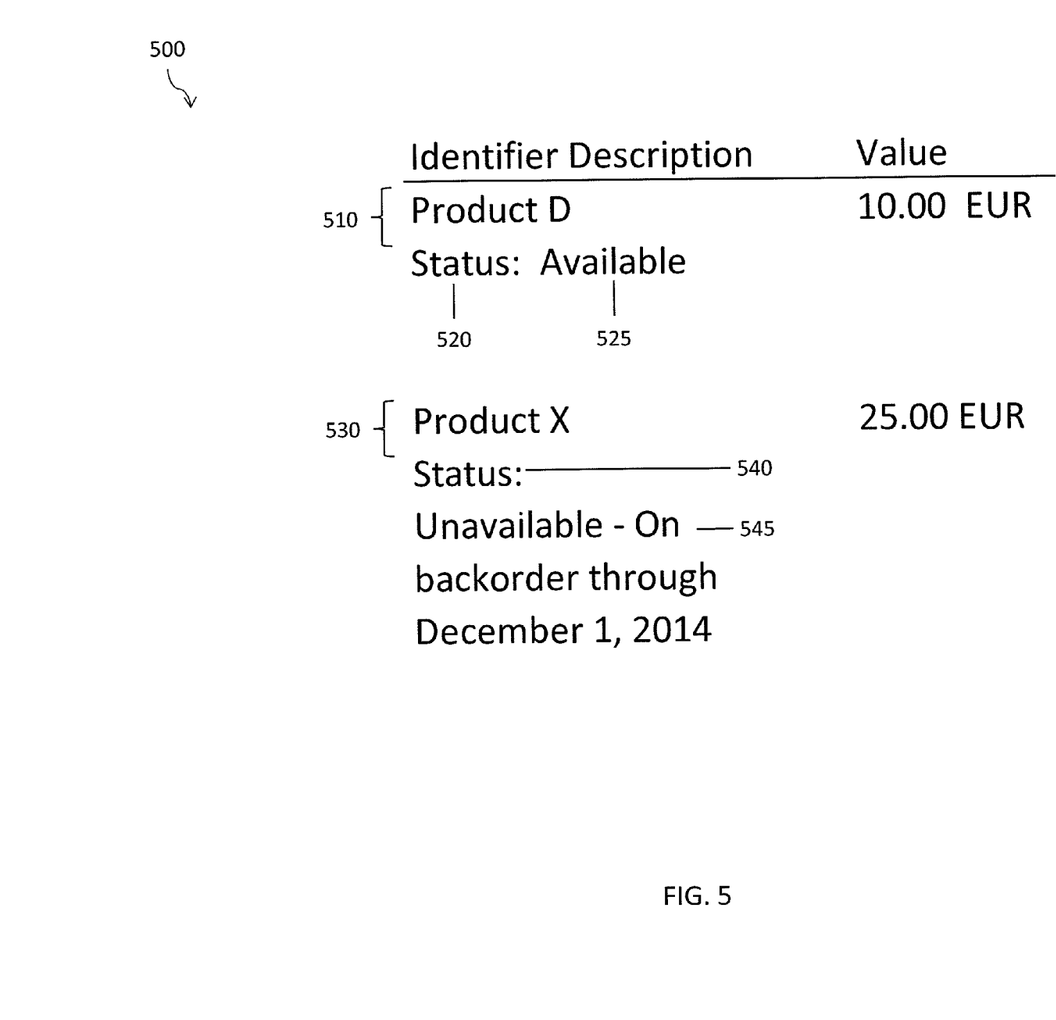
FIG. 5 illustrates another formatted table that may be viewed on a computing device, in accordance with some example implementations.

During operation 320, the table editing application may display column labels and data values using different representations. FIG. 5 illustrates a formatted table 500 that includes data records 510 and 530. Data records 510 and 530 each have a single column label ("Status") and a corresponding data value. In data record 510, the table editing application may display column label 520 and data value 525 using an in-line representation. In this in-line representation, column label 520 ("Status") may appear on the same row as data value 525 ("Available"). In data record 530, the table editing application may display column label 540 and data value 545 using a block representation. In this block representation, column label 540 may appear in the row above data value 545.

Whether the table editing application uses an in-line representation or a block representation to display column labels and data values may be configured. For example, a developer may manually configure the table editing application to always use an in-line representation or to always use a block representation.

In another example, this configuration may be dynamically set based on the number of characters in the data value. In this implementation, the table editing application may compare the number of characters in each data value to a threshold character limit. If the number of characters is less than or equal to this threshold character limit, then the table editing application may use an in-line representation. If, however, the number of characters is greater than this threshold character limit, then the table editing application may use a block representation. This threshold character limit may be a predetermined numerical value set by the developer. In the implementation of FIG. 5, the threshold character limit may be 10 characters, for example. Since data value 525 ("Available") has less than 10 characters, then the table editing application may use an in-line representation. Similarly, since data value 545 ("Unavailable—On backorder through Dec. 1, 2014") has more than 10 characters, then the table editing application may use a block representation.

In yet another example, this configuration may be based on the presence of a control object in the data value. As described above, control objects may include progress indicators, slider buttons, forms, input fields, drop-down boxes, and the like. Because control objects generally occupy a large amount of screen space, the table editing application may automatically use a block representation to display a control object and its corresponding column label. For example, if column label 550 additionally includes an input field for specifying a follow-up action, then the table editing application may display this input field below the column label using a block representation.

Figure 6:
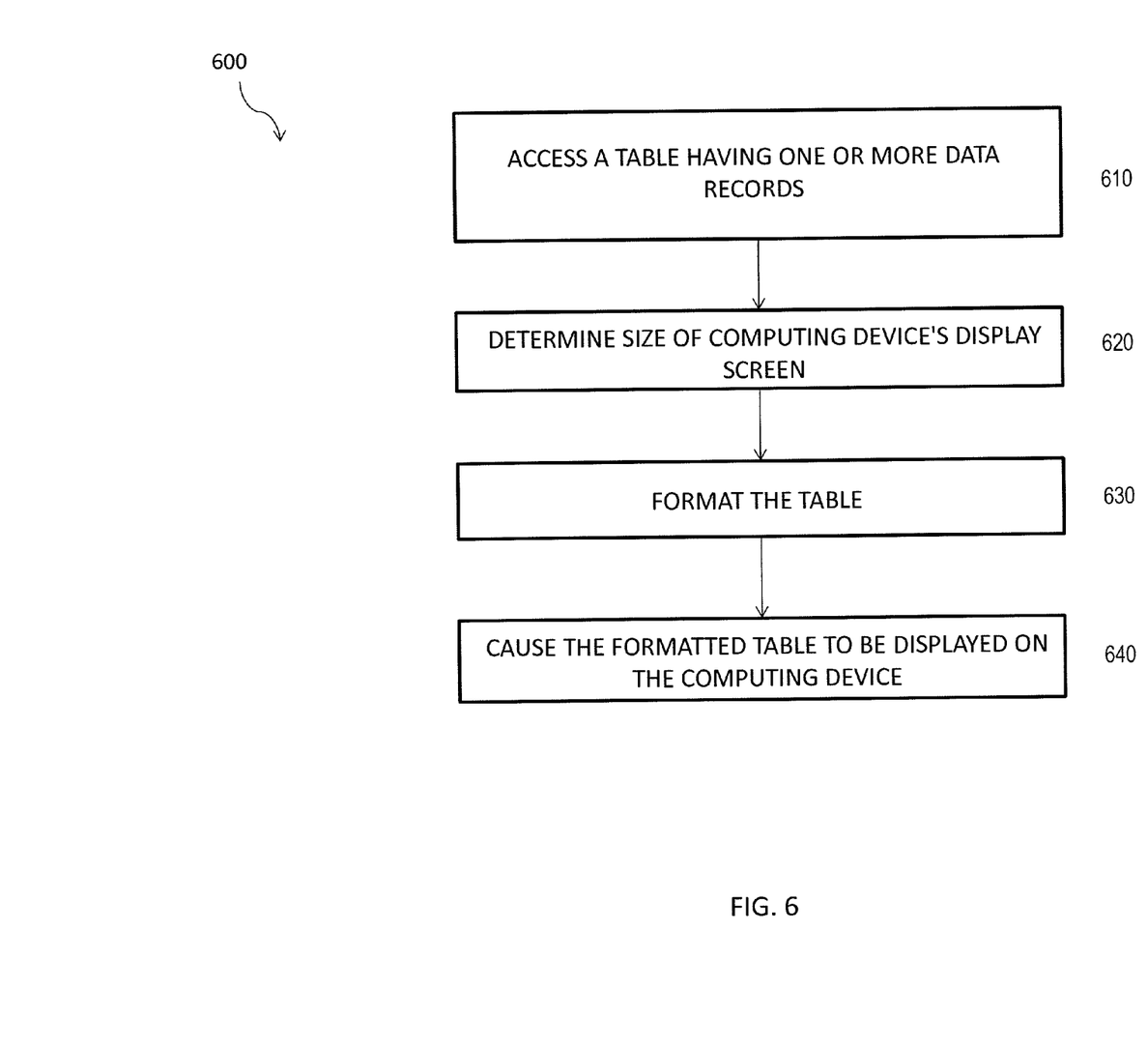
FIG. 6 illustrates a process for formatting a table for display on a computing device, in accordance with some example implementations.

FIG. 6 illustrates a process 600 for formatting a table for display on a computing device. At operation 610, the table editing application may access a table, such as table 200, upon receiving a request from a computing device. Table 200 may be stored at database server 120 and may include multiple data records having multiple data values distributed across the table's columns. Each column may have a column label and a column priority value.

At 620, the table editing application may determine the size of the display screen of the requesting computing device. This determination may be based, for example, on the computing device's type as described above with respect to operation 305 in FIG. 3.

At 630, the table editing application may format the table based on the size of the computing device's display screen and one or more column priorities. With regard to the former, the table editing application may not format table 200 if the computing device is a desktop computer. If, however, the computing device has a small display screen (e.g., a tablet computer or mobile phone), then the table editing application may format table 200 in accordance with operations 315 and 320 described above with respect to FIG. 3. During operation 315, the table editing application may keep certain columns in tabular form. During operation 320, the table editing application may adjust the order in which column labels and data values are displayed based on column priorities. The table editing application may display column labels and data values in the formatted table using an in-line representation, a block representation, or both.

At 640, the table editing application may cause the formatted table to be displayed on the computing device.

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

What is claimed is:

1. A non-transitory computer-readable medium containing instructions to configure a processor to perform operations comprising:
   receiving a request from a computing device, the request including an indication of a size of a display screen at the computing device;
   determining, from the received request, whether formatting to accommodate display size is needed for a table being requested by the received request;
   providing the table, when the determining indicates no formatting is needed to accommodate display size at the computing device; and
   when the determining indicates that formatting is needed to accommodate display size at the computing device,
   accessing a table having one or more rows and a plurality of columns, the one or more rows having one or more data values distributed across the plurality of columns, the plurality of columns each associated with one or more column labels and each associated with one or more priority values indicative of an order for displaying each of the plurality of columns in a reformatted table,
   determining, based on the received request, the display size of the display screen on the computing device,
   formatting the table to form the reformatted table by at least:
     maintaining, based on the corresponding priority values for a first column and a second column and based the determined display size, the first column including a first column label and corresponding data value placed below the first column label and the second column including a second column label and corresponding data value placed below the second column label, and
     moving, based on the corresponding priority values for a third column and a fourth column and based the determined display size, the third column including a third column label and a corresponding data value into a pop-in area and the fourth column including a fourth column label and a corresponding data value into the pop-in area, the pop-in area located in the reformatted table below presentation of columnar data including the first column and the second column and before a subsequent data record, the third column label and the corresponding data value presented as a first row in the pop-in area and the fourth column label and the corresponding data value are presented as a second row in the pop-in area, and
   causing the reformatted table to be displayed on the computing device.

2. The non-transitory computer-readable medium of claim 1, wherein the first row includes the third column label presented above the corresponding data value and the second row includes the fourth column label presented above the corresponding data value.

3. The non-transitory computer-readable medium of claim 2, wherein the first column and the second column have higher priority values than the third column and the fourth column.

4. The non-transitory computer-readable medium of claim 1, wherein the first row lies above the second row when a number of characters in the data value is greater than a threshold value or when the data value comprises a control object.

5. The non-transitory computer-readable medium of claim 4, wherein the control object is at least one of a progress indicator, a slider button, a form, an input field, and a drop-down box, a responsive table, a link, a chart, a microchart, a date picker, a radio button, and a switch.

6. The non-transitory computer-readable medium of claim 1, wherein the formatted table is viewable in its entirety only by unidirectional scrolling.

7. A method comprising:
   receiving a request from a computing device, the request including an indication of a size of a display screen at the computing device;
   determining, from the received request, whether formatting to accommodate display size is needed for a table being requested by the received request providing the table, when the determining indicates no formatting is needed to accommodate display size at the computing device; and when the determining indicates that formatting is needed to accommodate display size at the computing device, accessing a table having one or more rows and a plurality of columns, the one or more rows having one or more data values distributed across the plurality of columns, the plurality of columns each associated with one or more column labels and each associated with one or more priority values indicative of an order for displaying each of the plurality of columns in a reformatted table, determining, based on the received request, the display size of the display screen on the computing device, formatting the table to form the reformatted table by at least:

maintaining, based on the corresponding priority values for a first column and a second column and based the determined display size, the first column including a first column label and corresponding data value placed below the first column label and the second column including a second column label and corresponding data value placed below the second column label, and moving, based on the corresponding priority values for a third column and a fourth column and based the determined display size, the third column including a third column label and a corresponding data value into a pop-in area and the fourth column including a fourth column label and a corresponding data value into the pop-in area, the pop-in area located in the reformatted table below presentation of columnar data including the first column and the second column and before a subsequent data record, the third column label and the corresponding data value presented as a first row in the pop-in area and the fourth column label and the corresponding data value are presented as a second row in the pop-in area, and causing the reformatted table to be displayed on the computing device.

8. The method of claim 7, wherein the first row includes the third column label presented above the corresponding data value and the second row includes the fourth column label presented above the corresponding data value.

9. The method of claim 7, wherein the first column and the second column have higher priority values than the third column and the fourth column.

10. The method of claim 7, wherein the formatted table is viewable in its entirety only by unidirectional scrolling.

11. A system comprising:
a processor; and
a memory, wherein the processor and the memory are configured to perform operations comprising:
receiving a request from a computing device, the request including an indication of a size of a display screen at the computing device;

determining, from the received request, whether formatting to accommodate display size is needed for a table being requested by the received request;

providing the table, when the determining indicates no formatting is needed to accommodate display size at the computing device; and when the determining indicates that formatting is needed to accommodate display size at the computing device, accessing a table having one or more rows and a plurality of columns, the one or more rows having one or more data values distributed across the plurality of columns, the plurality of columns each associated with one or more column labels and each associated with one or more priority values indicative of an order for displaying each of the plurality of columns in a reformatted table, determining, based on the received request, the display size of the display screen on the computing device, formatting the table to form the reformatted table by at least:

maintaining, based on the corresponding priority values for a first column and a second column and based the determined display size, the first column including a first column label and corresponding data value placed below the first column label and the second column including a second column label and corresponding data value placed below the second column label, and moving, based on the corresponding priority values for a third column and a fourth column and based the determined display size, the third column including a third column label and a corresponding data value into a pop-in area and the fourth column including a fourth column label and a corresponding data value into the pop-in area, the pop-in area located in the reformatted table below presentation of columnar data including the first column and the second column and before a subsequent data record, the third column label and the corresponding data value presented as a first row in the pop-in area and the fourth column label and the corresponding data value are presented as a second row in the pop-in area, and causing the reformatted table to be displayed on the computing device.

12. The system of claim 11, wherein the first row includes the third column label presented above the corresponding data value and the second row includes the fourth column label presented above the corresponding data value.

13. The system of claim 11, wherein the first column and the second column have higher priority values than the third column and the fourth column.

14. The system of claim 11, wherein the formatted table is viewable in its entirety only by unidirectional scrolling.

* * * * *